(12) United States Patent
McCarthy et al.

(10) Patent No.: US 9,503,756 B2
(45) Date of Patent: Nov. 22, 2016

(54) ENCODING AND DECODING USING PERCEPTUAL REPRESENTATIONS

(75) Inventors: Sean T. McCarthy, San Francisco, CA (US); Vijay Kamarshi, Cupertino, CA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 637 days.

(21) Appl. No.: 13/315,409

(22) Filed: Dec. 9, 2011

(65) Prior Publication Data
US 2013/0148731 A1    Jun. 13, 2013

(51) Int. Cl.
| H04N 19/51 | (2014.01) |
| H04N 19/85 | (2014.01) |
| H04N 19/56 | (2014.01) |

(52) U.S. Cl.
CPC ............... *H04N 19/85* (2014.11); *H04N 19/51* (2014.11); *H04N 19/56* (2014.11)

(58) Field of Classification Search
CPC ........ H04N 19/85; H04N 19/51; H04N 19/56
See application file for complete search history.

(56) References Cited

U.S. PATENT DOCUMENTS

| 5,920,356 | A | 7/1999 | Gupta et al. |
| 6,014,468 | A | 1/2000 | McCarthy et al. |
| 6,360,021 | B1 | 3/2002 | McCarthy et al. |
| 6,366,705 | B1 * | 4/2002 | Chiu et al. .................... 382/239 |
| 7,046,468 | B2 | 5/2006 | Yamashita et al. |
| 7,046,857 | B2 | 5/2006 | McCarthy et al. |
| 2002/0150302 | A1 | 10/2002 | McCarthy et al. |
| 2006/0239348 | A1 | 10/2006 | Zhang et al. |
| 2008/0118179 | A1 | 5/2008 | Jeong et al. |
| 2010/0239022 | A1 | 9/2010 | Chujoh et al. |
| 2010/0265404 | A1 | 10/2010 | Mccarthy et al. |
| 2012/0307074 | A1 * | 12/2012 | Bhagavathy et al. ......... 348/180 |

FOREIGN PATENT DOCUMENTS

| JP | 6-113266 A | 4/1994 |
| WO | 9906941 | 2/1999 |
| WO | 2007011147 A1 | 1/2007 |
| WO | 2010121235 A1 | 10/2010 |

OTHER PUBLICATIONS

"Perceptual Video Processing, A New Approach to Enhanced Compression Efficiency", White Paper, Motorola, Aug. 8, 2010.

(Continued)

*Primary Examiner* — Mohammed Jebari
(74) *Attorney, Agent, or Firm* — Thomas A. Ward

(57) ABSTRACT

Encoding a video signal including pictures includes generating perceptual representations based on the pictures. Reference pictures are selected and motion vectors are generated based on the perceptual representations and the reference pictures. The motion vectors and pointers for the reference pictures are provided in an encoded video signal. Decoding may include receiving pointers for reference pictures and motion vectors based on perceptual representations of the reference pictures. The decoding of the pictures in the encoded video signal may include selecting reference pictures using the pointers and determining predicted pictures, based on the motion vectors and the selected reference pictures. The decoding may include generating reconstructed pictures from the predicted pictures and the residual pictures.

16 Claims, 12 Drawing Sheets

(56) References Cited

OTHER PUBLICATIONS

"Vision, Knowledge, and the Mystery Link" by John L. Pollock et al., Epistemology: New Essays, Quentin Smith (ed), Oxford University Press, Oct. 5, 2003.

"Image Compression, Fidelity Metrics and Models of Human Observer", Stanley A. Klein et al., UC Berkeley, Berkeley, CA 94720. 1994.

"An Eye-Opening Look at a New Approach to Image Processing", Motorola eZine for Government, vol. 3, Issue 4, Oct. 2009.

Chao Wang, et al, "Video Enhancement Using Adaptive Spatio-Temporal Connective Filter and Piecewise Mapping"; EURASIP Journal on Advances in Signal Processing, vol. 2008, pp. 1-13.

Scognamiglio G, et al, "Picture Enhancement in Video and Block-Coded Image Sequences"; IEEE; vol. 45, #3; pp. 680-689; Aug. 1, 1999.

Melange, T. et al: Video Denoising by Fuzzy Motion and Detail Adaptive Averaging, Journal of Electronic Imaging SPIE—The Int'l Society for Optical Engineering, USA; vol. 17, #4; Oct. 2008.

Brailean, J.C. et al.: Noise Reduction Filters for Dynamic Image Sequences: A Review, IEEE, vol. 83, #9; pp. 1272-1291; Sep. 1, 1995.

Zolokolica, V. et al.: "Wavelet-Domain Video Denoising Based on reliability Measures", IEEE; vol. 16, #8; pp. 993-1007; Aug. 1, 2006.

Wang, Zhou et al.: "Mean Squared Error: Love It or Leave It? [A new look at signal fidelity measures]", IEEE Signal Processing Magazine, Jan. 2009, pp. 98-117.

Michal Irani and P. Anandan: About Direct Methods, ICCV Workshop on Vision Algorithms, pp. 267-277, 1999.

Torr, P.H.S. et al.: "Feature Based Methods for Structure and Motion Estimation", ICCV Workshop on Vision Algorithms, 1999, pp. 278,294..

Patent Cooperation Treaty, "PCT Search Report and Written Opinion of the International Searching Authority" for International Application No. PCT/US2012/068445 dated Feb. 25, 2013, 16 pages.

Weigand et al., "Overview of the H264/AVE Video Coding Standard" IEEE Transactions on Circuits and Systems for Video Technology; vol. 13, No. 7; Jul. 2003; 18 pages.

Natarajan et al., "Low-Complexity Block-Based Motion Estimation via One-Bit Transforms" IEEE Transactions on Circuits and Systems for Video Technology vol. 7, No. 4; Aug. 1997; 6 pages.

Office Action, Re: Japanese Application No. 2014-546117 (Foreign Text and English Translation), dated Jun. 23, 2015.

Editorial supervisor, Skae Okubo, "Impress Standard Textbook Revision third edition", H.264 1AVC Textbook, First adition, Jan. 1, 2009, Impress Co. R&D, p. 117-123, ISBN:978-4-8443-2664-9.

S. Kato, et al., "Mathematical model of lateral inhibition mechanism and application to color image processing," IEICE Report of Research, vol. 96, No. 308, The institute of Electronics, Information and Communication Engineers, Oct. 18, 1996, p. 41-48.

R. Kawada, et al., "Block matching motion detection using visual model," ITE Report of Research Television, vol. 16, No. 47, The Institute of Television Engineers, Jul. 23, 1992, p. 25-31.

* cited by examiner

ENCODING AND DECODING USING PERCEPTUAL REPRESENTATIONS

BACKGROUND

Motion processing includes the use of motion vectors in both motion estimation and motion compensation. Motion estimation is the process of determining motion vectors. The motion vectors describe the transformation of objects from one two dimensional image to another, commonly from adjacent frames or pictures in a video sequence. Motion compensation is the process of applying the determined motion vectors to objects in one picture in order to synthesize the transformation of the described objects to a subsequent picture in the video sequence. The combination of motion estimation and motion compensation is a key part of video compression and often is highly demanding in terms of processing costs.

The motion vectors in motion processing are determined by methods which may be categorized as either direct or indirect. In practice, direct methods relying on pyramidal and block-based searches are typically used in video encoders. Direct methods often require increases to processing power and processing costs in order to increase the accuracy and/or precision of motion vectors determined by these methods.

Indirect methods for determining motion vectors often use statistical functions, applied over a local or global area in a picture, to identify matches between estimated movement occurring in the pictures and generated motion vectors. Fidelity metrics are commonly utilized in attempting to identify and remove false matches which do not correspond to actual motion. However, fidelity metrics often lead to opportunistic best matches, which are errors, and motion vector outliers, which are inefficient as they require more bits to code. These limitations tend to reduce video compression quality and efficiency.

Furthermore, existing evaluation methods, in relying on fidelity metrics, tend to favor high contrast regions in a picture. This often produces poor motion estimates for regions of low texture, and commonly leads to noticeably incorrect motion in these low textures. Also, fidelity metrics often fail to discriminate motion that occurs during changes within a video sequence to contrast, brightness, blur, added noise, artifacts, and other differences which can occur during fades, dissolves, and compression. These other limitations also tend to reduce video compression quality and efficiency.

The weaknesses of fidelity metrics in any of these circumstances may often be alleviated by increasing the motion processing power, which raises processing costs. Nevertheless, in circumstances in which fidelity metrics are less effective, motion processing using existing evaluation methods often requires a trade-off between achieving more accurate/precise motion vectors in video compression and lower processing costs.

BRIEF DESCRIPTION OF THE DRAWINGS

Features of the examples and disclosure are apparent to those skilled in the art from the following description with reference to the figures, in which.

SUMMARY

Figure 1:
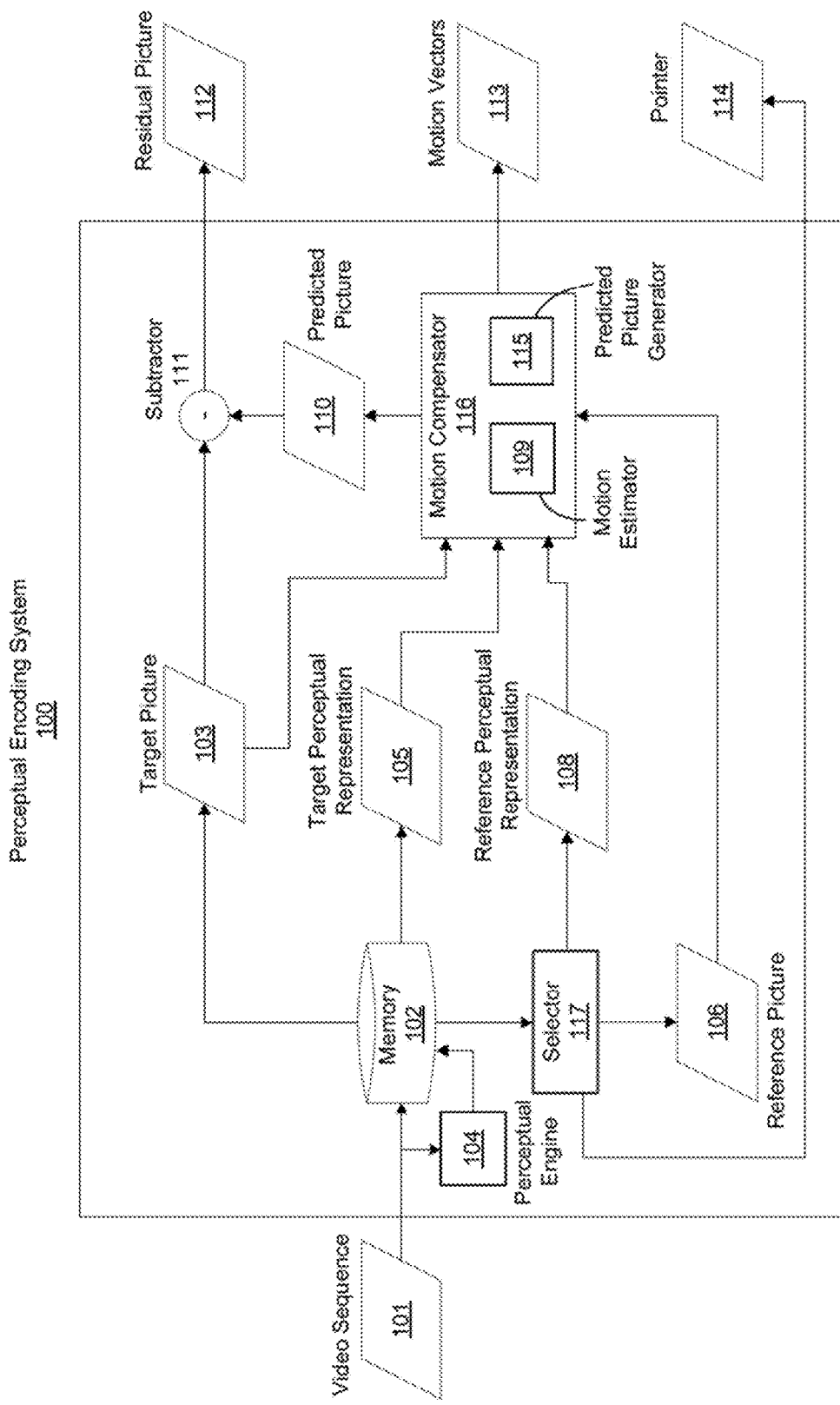
FIG. 1 is a block diagram illustrating a perceptual encoding system utilizing perceptual representations, according to an example.

According to embodiments of the invention, there are systems, methods, and computer readable mediums (CRMs) which provide for encoding and decoding utilizing perceptual representations in determining or utilizing motion vectors. The utilization of perceptual representations produces motion vectors having improved accuracy and/or precision. Perceptual representations may be utilized in increasing the accuracy and/or precision of motion vectors for regions of low texture in a picture and/or for pictures in transition sequences. The accuracy and precision of motion vectors is particularly increased for video sequences including changes to contrast, brightness, blur, added noise, artifacts, and other differences which can occur during fades, dissolves, and compression. Utilizing perceptual representations in determining or utilizing motion vectors produces improved compression efficiency and lowers motion processing requirements and/or processing costs.

According to an embodiment, a system for encoding comprises an interface configured to receive a video signal including original pictures in a video sequence including pictures. The system includes a processor configured to generate target perceptual representations based on the received original pictures, select reference pictures from a plurality of reference pictures, and determine motion vector information based on the target perceptual representations and the selected reference pictures. The determined motion vector information is determined based on attributes of the reference pictures and the target perceptual representations. The system encodes the motion vector information and encodes pointers associated with the selected reference picture.

According to another embodiment, a method for encoding comprises receiving a video signal including original pictures in a video sequence including pictures; generating target perceptual representations based on the received original pictures; selecting reference pictures from a plurality of reference pictures; determining, utilizing a processor, motion vector information based on the target perceptual representations and the reference pictures, wherein the determined motion vector information is determined based on attributes of the reference pictures and the target perceptual representations; encoding the determined motion vector information, and encoding pointers associated with the reference pictures.

The method for encoding may be embodied by computer readable instructions stored on a non-transitory computer readable medium. The instructions may be executed by a processor to perform the method.

According to yet another embodiment, a system for decoding comprises an interface configured to receive motion vector information. The motion vector information may be based on target perceptual representations based on original pictures from a video sequence including pictures, and reference pictures associated with the target perceptual representations. The interface is also configured to receive pointers associated with the reference pictures, and receive residual pictures associated with the received motion vector information. The system also includes a processor configured to select reference pictures from a plurality of reference pictures utilizing the received pointers, determine predicted pictures based on the received motion vector information and the selected reference pictures, and generate reconstructed pictures based on the predicted pictures and the residual pictures.

According to yet another embodiment, a method for decoding comprises receiving motion vector information, wherein the motion vector information is based on target perceptual representations based on original pictures from a video sequence including pictures, and reference pictures associated with the target perceptual representations; receiving pointers associated with the respective reference pictures; receiving residual pictures associated with the received motion vector information; selecting reference pictures from a plurality of reference pictures utilizing the respective received pointers; determining, utilizing a processor, predicted pictures based on the received motion vector information and the respective selected reference pictures; and generating reconstructed pictures based on the determined predicted pictures and the received residual pictures.

The method for decoding may be embodied by computer readable instructions stored on a non-transitory computer readable medium. The instructions may be executed by a processor to perform the method.

DETAILED DESCRIPTION

For simplicity and illustrative purposes, the present invention is described by referring mainly to embodiments and examples thereof. In the following description, numerous specific details are set forth in order to provide a thorough understanding of the examples. It is readily apparent however, that the present invention may be practiced without limitation to these specific details. In other instances, some methods and structures have not been described in detail so as not to unnecessarily obscure the description. Furthermore, different embodiments are described below. The examples may be used or performed together in different combinations. As used herein, the term "includes" means includes but not limited to the term "including". The term "based on" means based at least in part on.

As demonstrated in the following examples, there are perceptual engines, encoding and decoding systems, methods, and machine readable instructions stored on computer-readable media (CRMs) for encoding and decoding motion vector information based on perceptual representations. Perceptual representations include maps of frames and/or pictures, such as those in a video sequence. The maps in perceptual representations may include calculated values associated with units in the pictures, such as pixels. The calculated values in the maps of perceptual representations may be developed based on a model of human perception. Further details regarding perceptual representations, and how they are generated and utilized in encoding and decoding, are provided below.

Referring to FIG. 1, there is shown a perceptual encoding system 100, such as may be found in an apparatus at a headend for distributing content in a compressed bitstream, such as a transport stream. According to an example, the perceptual encoding system 100 receives a video sequence, such as video sequence 101. The video sequence may be included in a video bitstream. Video sequence 101 may include frames or pictures which may be located or stored as original pictures in a memory associated with the perceptual encoding system 100, such as memory 102. The memory 102 may include one or more buffers or higher capacity storage. The pictures from the video sequence 101 may be converted to perceptual representations by perceptual engine 104 and stored in the memory 102. Detailed steps and parameters by which perceptual representations may be generated are described in greater detail below, such as with respect to FIG. 4.

A target picture, such as target picture 103, may be retrieved from the memory 102 for compression and encoding. The target picture 103 may be an original picture from the video sequence 101. Also, a reference picture 106 for determining motion vectors may be retrieved from the memory 102. The target picture 103 and the reference picture 106 are signaled to a motion compensator 116 to generate a predicted picture 110 and motion vectors 113. The motion vectors 113 may be generated from perceptual representations of the target picture 103 and the reference picture 106 as described below. The perceptual representations are shown as target perceptual representation 105 and reference perceptual representation 108.

A pointer 114 may be associated with the reference picture 106. The pointer 114 may identify reference picture 106 or an attribute associated with the reference picture. The pointer 114 may be an identity, an association, an attribute, a location, such as a memory address, etc. The pointer 114 may be encoded and transmitted from the perceptual encoding system 100 for a downstream decoding process based on or associated with the reference picture 106.

According to an example, the target picture 103 is retrieved from the memory 102 and signaled to the motion compensator 116. Also, the target perceptual representation 105, which may be generated by the perceptual engine 104 from the target picture 103, is retrieved from the memory 102 and signaled to the motion compensator 116. The reference picture 106 is selected by selector 117 from the memory 102 and signaled to the motion compensator 116. The reference perceptual representation 108, which may be generated by the perceptual engine 104 from the reference picture 106, is retrieved from the memory 102 and signaled to the motion compensator 116. The motion compensator 116 may comprise a motion estimator 109 and a predicted picture generator 115. The motion estimator 109 receives the target perceptual representation 105 and the reference perceptual representation 108 and determines motion vectors 113 utilizing both. The motion vectors 113 may be encoded and transmitted in a compressed video bitstream, separate from or together with the pointer 114. The motion vectors 113 may be determined by scanning and identifying blocks in the reference perceptual representation 108 that are the similar to blocks in the target perceptual representation 105 and generating pointers to the similar blocks.

The predicted picture generator 115 uses the motion vectors 113, determined by the motion estimator 109, and the reference picture 106 to generate the predicted picture 110. A subtractor 111 may receive and process the predicted picture 110 together with the target picture 103 to generate residual picture 112. The residual picture 112 is reduced for encoding and transmission downstream to a decoding system. The residual picture 112 may exclude the motion estimated areas of the target picture 103, such as the regions associated with the motion vectors 113. The residual picture 112 is an encoded picture transmitted from the perceptual encoding system 100 for a downstream decoding process based on or associated with the target picture 103.

Figure 2:
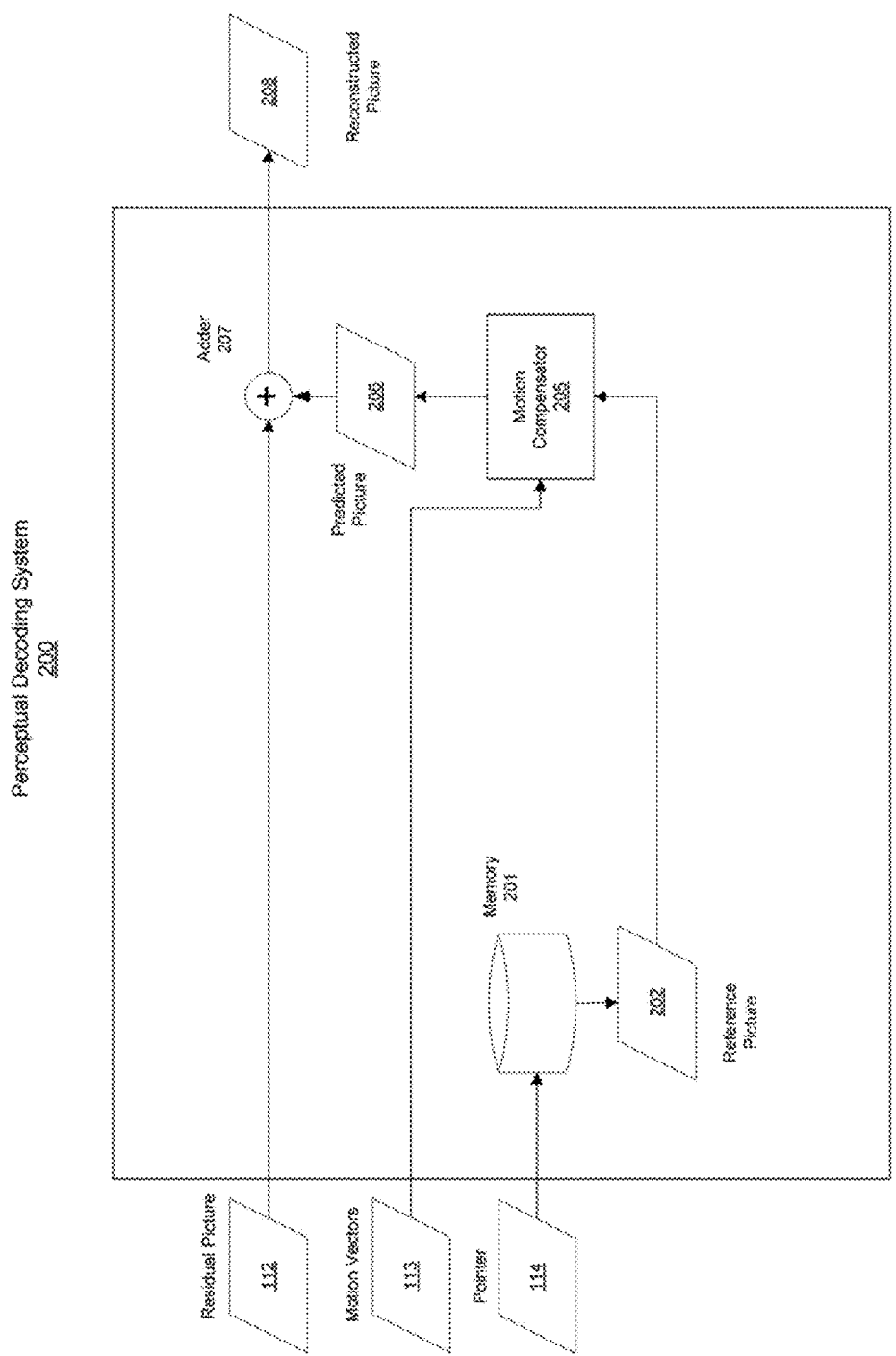
FIG. 2 is a block diagram illustrating a perceptual decoding system utilizing perceptual representations, according to an example.

Referring to FIG. 2, there is shown a perceptual decoding system 200, such as may be found in an apparatus such as a set top box, a transcoder, a handset, a personal computer, or other client device for receiving content in a compressed bitstream, such as a transport stream. According to an example, the perceptual decoding system 200 receives the residual picture 112, the motion vectors 113 and the pointer 114. Any of these may be located or stored in a memory associated with the perceptual decoding system 200, such as memory 201. The perceptual decoding system 200 may utilize the pointer 114 to select a reference picture from the memory 201, such as reference picture 202. The reference picture 202 corresponds to or is associated with the reference picture 106. The relationship between the reference picture 202 and reference picture 106 may be determined or identified through the pointer 114.

According to an example, a motion compensator in the perceptual decoding system 200, such as motion compensator 205, may receive both the reference picture 202 and the motion vectors 113. Motion compensator 205 may generate a predicted picture, such as predicted picture 206. The predicted picture 206 may be generated based on the reference picture 202 and the motion vectors 113. The predicted picture 206 may be signaled to an adder, such as adder 207. The adder 207 may generate a reconstructed picture, such as reconstructed picture 208. The reconstructed picture 208, may be generated based on both the predicted picture 206 and the residual picture 112.

Figure 3:
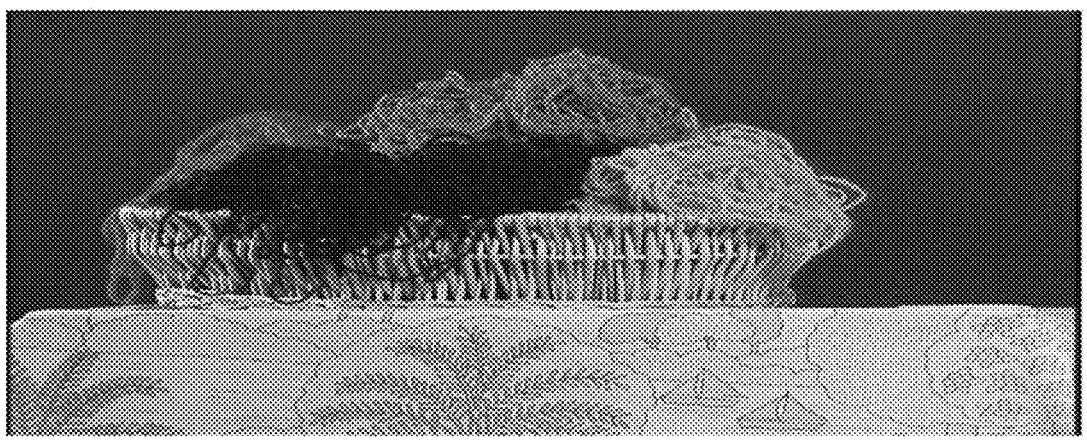
FIG. 3 is photographic images depicting a perceptual representation and an original picture, according to an example.
Figure 3:
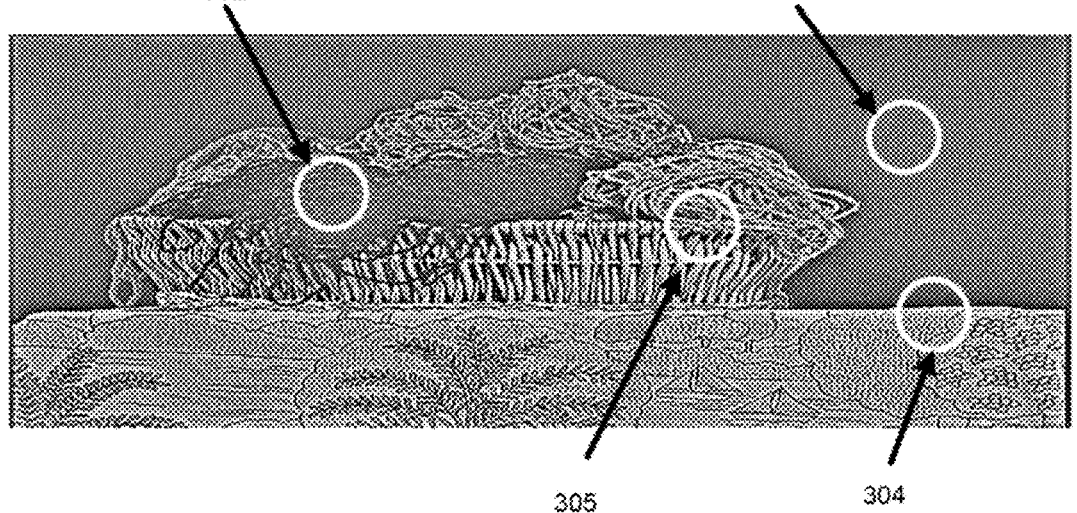

The perceptual representations of original pictures, rather than the original pictures themselves, are a basis for determining motion vectors. Referring to FIG. 3, an original picture 300 and a corresponding perceptual representation 301 are provided. The perceptual representation 301 mimics the adaptive contrast constancy of human vision. Regions 302 and 303 of the perceptual representation 301 depict an enhanced imaging of low contrast regions 302 and 303 which are associated with low-level textures appearing in the original picture 300. The enhanced imaging appearing in the regions 302 and 303 of the perceptual representation 301 may improve block-based motion matches in motion estimation of these areas.

Region 304 of perceptual representation 301 depicts a region of original picture 300 which may be associated with "Mach bands" phenomena. Mach bands are perceptual phenomena, named after the physicist Ernst Mach, and is associated with light or dark stripes which are perceived by the human eye as appearing next to a boundary between two regions of an image which have different lightness. The Mach bands effect is due to the spatial high-boost filtering performed by the human visual system on the luminance channel of the image captured by the retina. This filtering is largely performed in the retina itself, by lateral inhibition among neurons. Mach bands phenomenon, and similar texture masking, is performed through filtering in the retina which may occur near high contrast edges and features. Region 304 of perceptual representation 301 illustrates how gradients such as Mach bands phenomenon, and similar texture masking, is captured through perceptual representation. These gradients may not otherwise be available in an original picture for block-based motion vector matching.

Region 305 of perceptual representation 301 depicts a high contrast feature of original picture 300 which is shown to be preserved in the region 305 of the perceptual representation 301.

Figure 4:
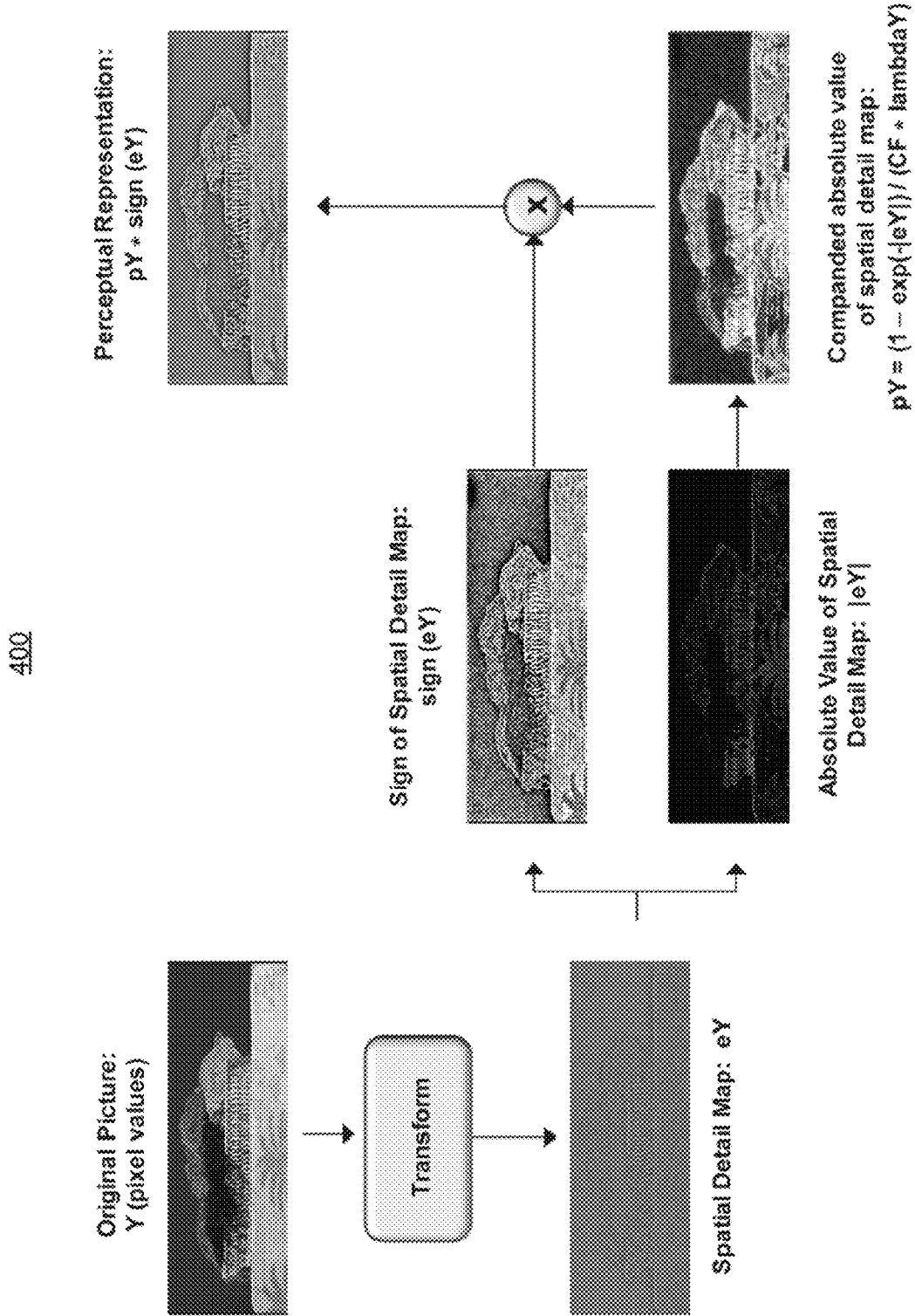
FIG. 4 is a flow diagram illustrating calculations in a process for generating perceptual representations, according to an example.

A process for generating perceptual representations from original pictures is now described. Referring to FIG. 4, an example of generating perceptual representations from an original picture is shown in flow diagram 400. The original picture has a Y value assigned to each pixel. For example, $Y_{i,j}$ is the luma value of the pixel at coordinates i, j of an image having size M by N.

The Y pixel values referenced in flow diagram 400 are associated with the original picture. These Y values are transformed to eY values in a spatial detail map. A spatial detail map is a weighting map forming a processed picture from an original picture. The spatial detail map may be created by the perceptual encoding system 100 using a model of the human visual system that takes into account the statistics of natural images and the response functions of cells in the retina. The weighting map may be a pixel map of the original picture based on the model of the human visual system. The weighting map may include a value or weight for each pixel identifying a level of difficulty for visual perception and/or a level of difficulty for compression. The level of difficulty for compression may be a continuous scale measuring the number of bits needed to encode the pixel or area of the image. Similarly, the level of difficulty for visual perception is a continuous scale measuring the number of bits needed to encode the pixel or area of the image as associated with the ability of a viewer to track details in the pixel or area. A process of generating a weighting map is described in more detail in U.S. patent application Ser. No. 12/761,581, entitled "System for Reducing Noise in Video Processing," filed on Apr. 16, 2010, which is incorporated by reference in its entirety.

According to an example, the model associated with the human visual system, which may be used to create the weighting map, includes an integrated perceptual guide (IPeG) system. The IPeG system implements an IPeG transform that generates an "uncertainty signal" associated with processing of data with a certain kind of expectable ensemble-average statistic, such as the scale-invariance of natural images. The IPeG transform models the behavior of certain cell classes in the human retina. The IPeG transform can be achieved by 2d spatial convolution followed by a summation step. Refinement of the IPeG transform may be achieved by adding a low spatial frequency correction, which may, in turn, be approximated by a decimation followed by an interpolation, or by other low pass spatial filtering. Pixel values provided in a computer file or provided from a scanning system may be provided to the transform to generate the spatial detail map. An IPeG system is described in more detail in U.S. Pat. No. 6,014,468 entitled "Apparatus and Methods for Image and Signal Processing," issued Jan. 11, 2000; U.S. Pat. No. 6,360,021 entitled "Apparatus and Methods for Image and Signal Processing," issued Mar. 19, 2002; U.S. Pat. No. 7,046,857 entitled "Apparatus and Methods for Image and Signal Processing," a continuation of U.S. Pat. No. 6,360,021 issued May 16, 2006, and International Application PCT/

US98/15767, entitled "Apparatus and Methods for Image and Signal Processing," filed on Jan. 28, 2000, which are incorporated by reference in their entireties. The IPeG system provides information including a set of signals that organizes visual details into perceptual significance, and a metric that indicates the ability of a viewer to track certain video details.

The spatial detail map shown in FIG. 4 includes the values eY. For example, $eY_{i,j}$ is a value at i, j of an IPeG transform of the Y value at i, j from the original picture. Each value $eY_{i,j}$ may include a value or weight for each pixel identifying a level of difficulty for visual perception and/or a level of difficulty for compression. Each $eY_{i,j}$ may be positive or negative.

As shown in FIG. 4, a sign of spatial detail map, e.g., sign (eY), and an absolute value of spatial detail map, e.g., |eY|, are generated from the spatial detail map. According to an example, sign information may be generated as follows:

$$\text{sign}(eY_{i,j}) = \begin{cases} +1, \text{ for } eY_{i,j} > 0 \\ 0, \text{ for } eY_{i,j} = 0 \\ -1, \text{ for } eY_{i,j} < 0 \end{cases}$$

According to another example, the absolute value of spatial detail map is calculated as follows: $|eY_{i,j}|$ is the absolute value of $eY_{i,j}$.

A companded absolute value of spatial detail map, e.g., pY, is generated from the absolute value of spatial detail map, |eY|. According to an example, companded absolute value information may be calculated as follows: $pY_{i,j}=1-e^{-|eY_{i,j}|/(CF\times\lambda^y)}$, and $$\lambda_Y = \frac{\sum_{i=1}^{M}\sum_{j=1}^{N}|eY_{i,j}|}{M \times N},$$

where CF (companding factor) is a constant provided by a user or system and where $\lambda_y$ is the overall mean absolute value of $|eY_{i,j}|$. "Companding" is a portmanteau word formed from "compression" and "expanding". Companding describes a signal processing operation in which a set of values is mapped nonlinearly to another set of values typically followed by quantization, sometimes referred to as digitization. When the second set of values is subject to uniform quantization, the result is equivalent to a non-uniform quantization of the original set of values. Typically, companding operations result in a finer (more accurate) quantization of smaller original values and a coarser (less accurate) quantization of larger original values. Through experimentation, companding has been found to be a useful process in generating perceptual mapping functions for use in video processing and analysis, particularly when used in conjunction with IPeG transforms. $pY_{i,j}$ is a nonlinear mapping of the $eY_{i,j}$ values and the new set of values $pY_{i,j}$ have a limited dynamic range. Mathematic expressions other than shown above may be used to produce similar nonlinear mappings between $eY_{i,j}$ and $pY_{i,j}$. In some cases, it may be useful to further quantize the values, $pY_{i,j}$. Maintaining or reducing the number of bits used in calculations might be such a case.

The perceptual representation may be generated by combining the sign of the spatial detail map with the companded absolute value of the spatial detail map as follows: $pY_{i,j}\times\text{sign}(eY_{i,j})$. The results of $pY_{i,j}\times\text{sign}(eY_{i,j})$ is a compressed dynamic range in which small absolute values of $eY_{i,j}$ occupy a preferentially greater portion of the dynamic range than larger absolute values of $eY_{i,j}$, but with the sign information of $eY_{i,j}$ preserved.

Figure 5:
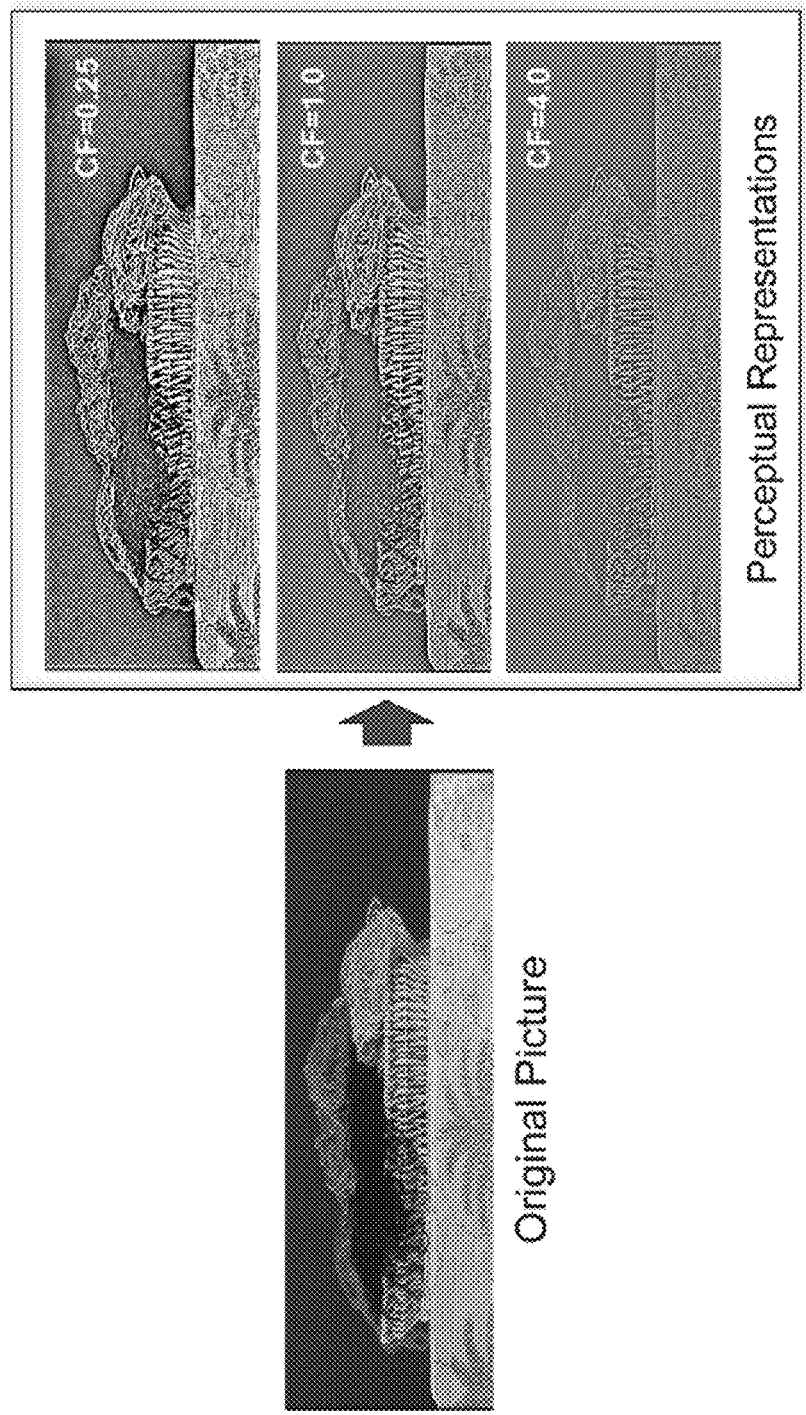
FIG. 5 is photographic images depicting an original picture and a series of perceptual representations based on different companding factors, according to an example.
Figure 6:
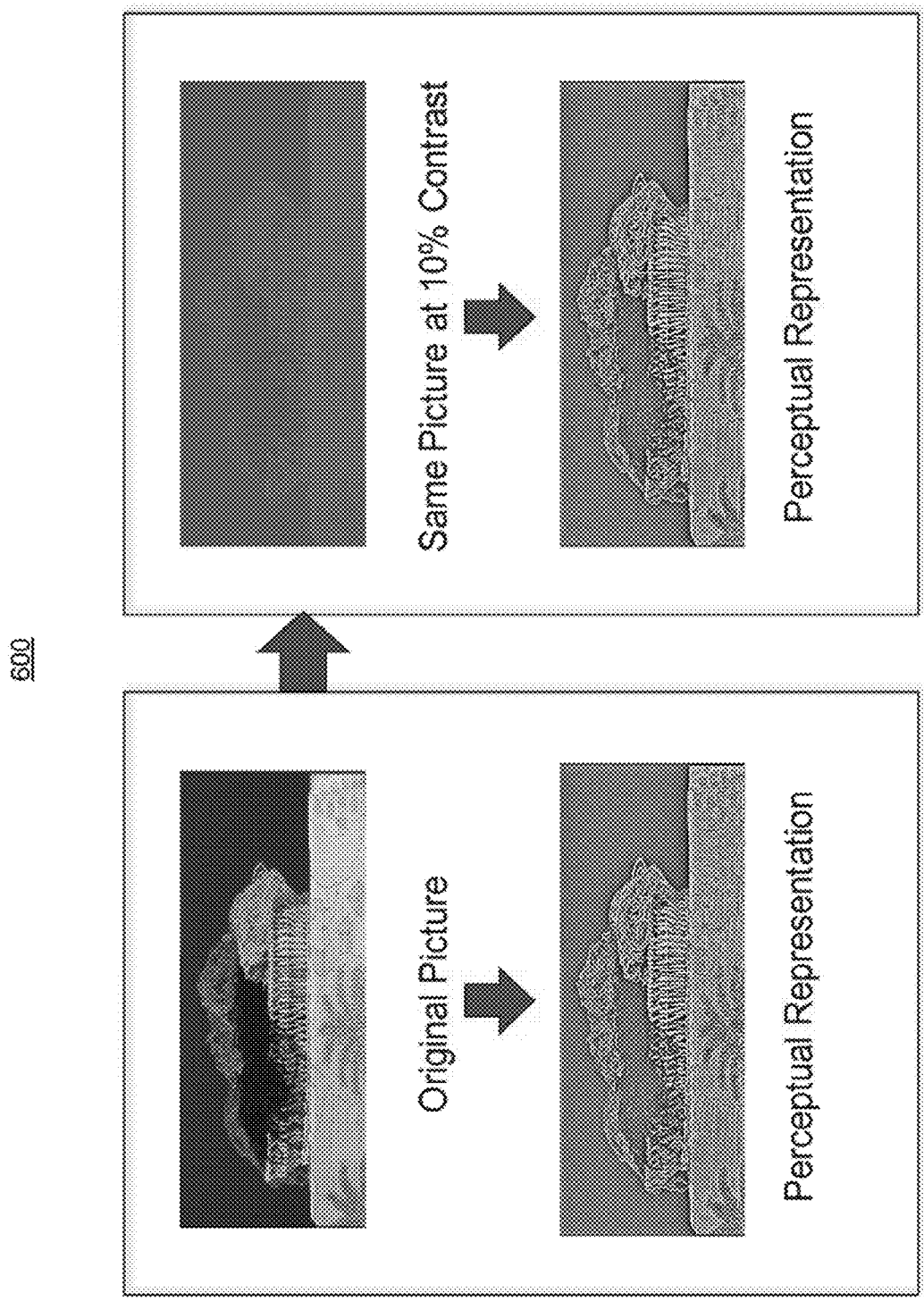
FIG. 6 is photographic images depicting the resilience of perceptual representations to changes in contrast applied to an original picture, according to an example.
Figure 7:
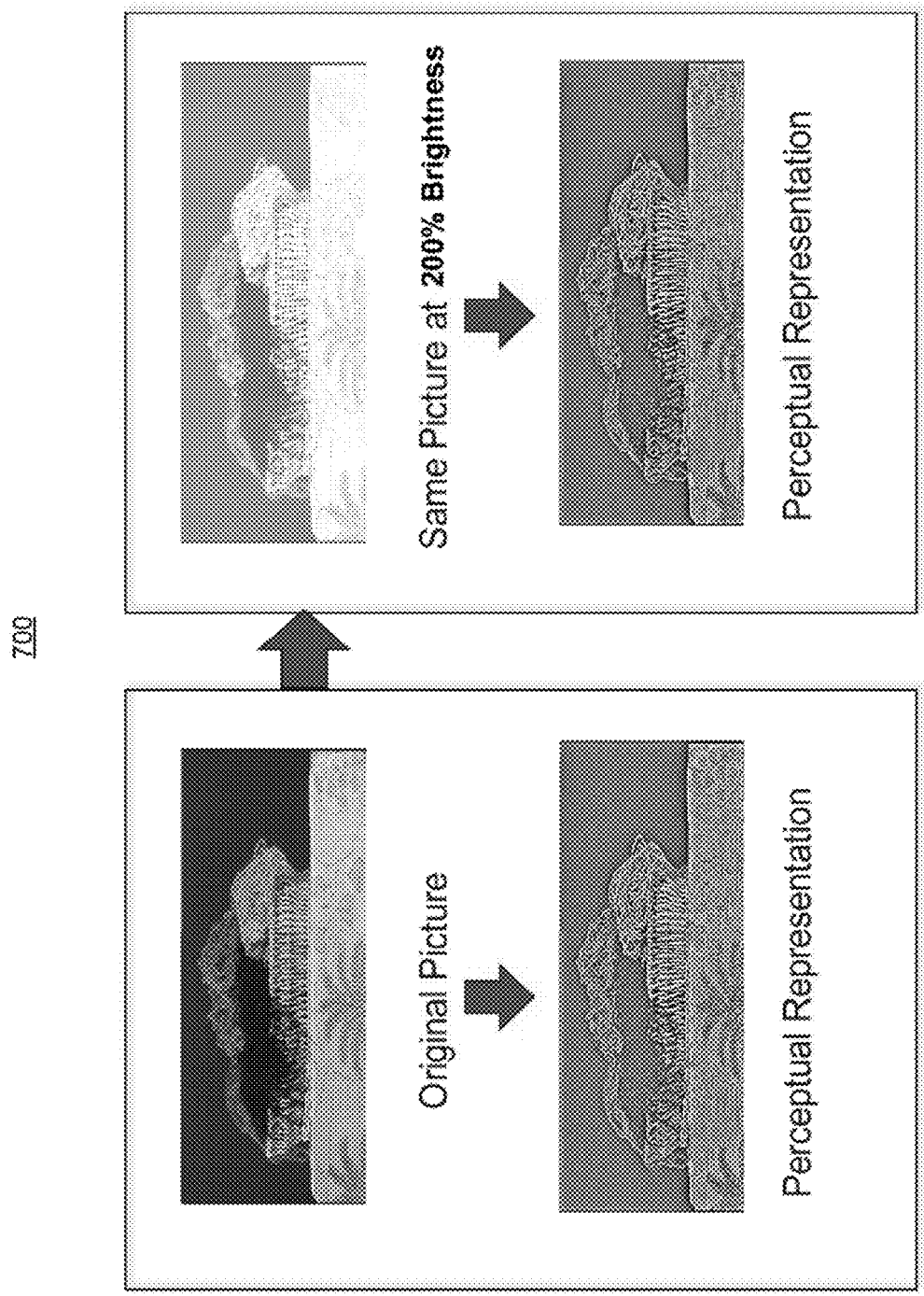
FIG. 7 is photographic images depicting the resilience of perceptual representations to changes in brightness applied to an original picture, according to an example.

Referring to FIG. 5, there is shown a flow diagram 500 demonstrating different perceptual representations generated from an original picture by various different companding factors. Referring to FIG. 6, there is shown a flow diagram 600 including perceptual representations generated based on an original picture and the same original picture at a lower contrast which is 10 percent of the contrast in the original picture. The perceptual representation for both is comparatively similar demonstrating the resilience of perceptual representations to changes in contrast. Referring to FIG. 7, there is shown a flow diagram 700 including showing perceptual representations generated based on an original picture and the same original picture at a higher brightness which is 200 percent of the brightness in the original picture. The perceptual representation for both is comparatively similar demonstrating the resilience of perceptual representations to changes in brightness.

Figure 8:
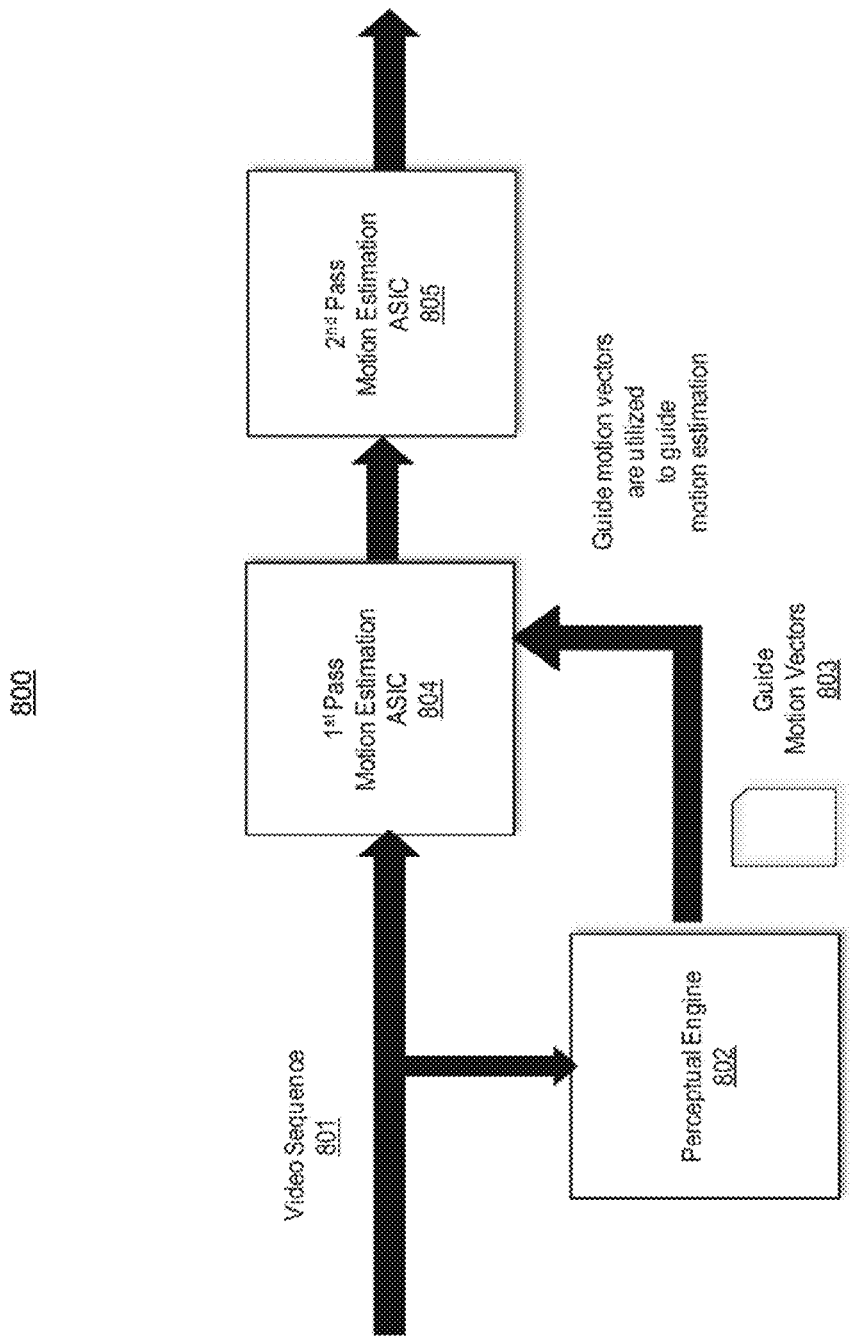
FIG. 8 is a block diagram illustrating a motion estimation flow process in a system for encoding utilizing perceptual representations, according to an example.

Referring to FIG. 8, there is shown a flow diagram 800 demonstrating a motion estimation flow process executed by a motion estimator, such as motion estimator 109, in a system for encoding utilizing perceptual representations. In flow diagram 800, a video sequence 801 includes pictures which are signaled to a perceptual engine 802 and a $1^{st}$ pass motion estimation ASIC 804 in the motion estimator. The perceptual engine 802 generates guide motion vectors 803. The guide motion vectors 803 are signaled to the $1^{st}$ pass motion estimation ASIC 804 where they may be utilized in a pre-analysis process to generate motion vector "seeds" or "hints", which may be utilized by a $2^{nd}$ pass motion estimation ASIC 805 to generate motion vectors, such as the motion vectors 113.

Figure 9:
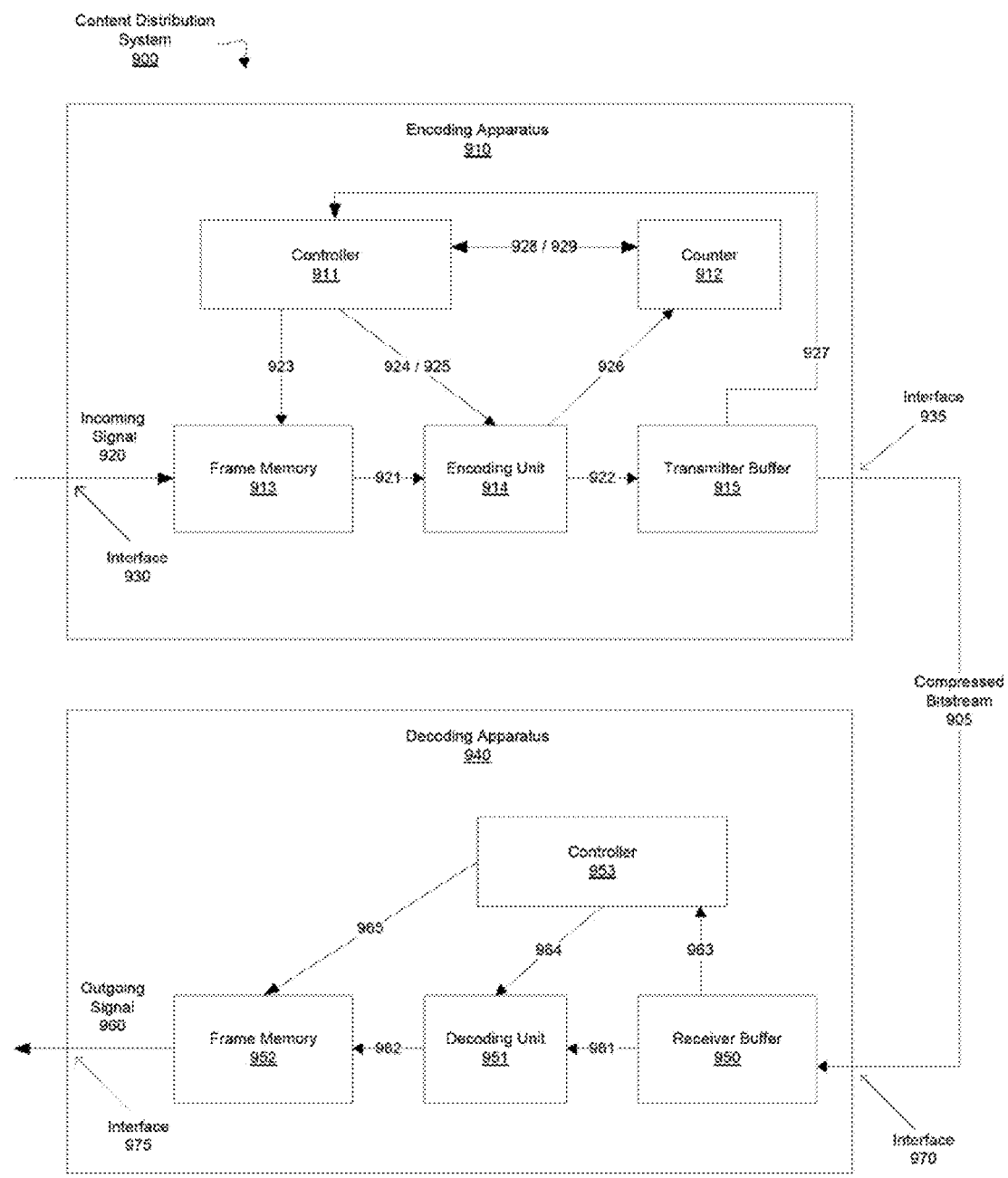
FIG. 9 is a block diagram illustrating a content distribution system, according to an example.

Referring to FIG. 9, perceptual representations may be utilized in motion estimating and/or determining and/or utilizing motion vectors according to various video encoding formats, such as MPEG-2, MPEG-4 AVC and the like. In FIG. 9, there is shown an example of a content distribution system 900, including an encoding apparatus 910 and a decoding apparatus 940, according to an example. The encoding apparatus 910 is representative of any encoding system which may be utilized in compression or transcoding of a video sequence, such as those discussed above with respect to FIGS. 1 and 2. The decoding apparatus 940 is representative of any of the set top boxes or other receiving devices, such as those discussed above with respect to FIGS. 1 and 2. The encoding apparatus 910 may transmit a compressed bitstream 905, including motion vectors and other information associated with encoding utilizing perceptual representations, to the decoding apparatus 940, according to an example.

Referring again to FIG. 9, the encoding apparatus 910 includes an interface 930 for an incoming signal 920, a controller 911, a counter 912, a frame memory 913, an encoding unit 914, a transmitter buffer 915 and an interface 935 for the outgoing compressed bitstream 905. The decoding apparatus 940 includes a receiver buffer 950, a decoding unit 951, a frame memory 952 and a controller 953. The encoding apparatus 910 and the decoding apparatus 940 are coupled to each other via a transmission path for the compressed bitstream 905. The controller 911 of the encoding apparatus 910 may control the amount of data to be transmitted on the basis of the capacity of the receiver buffer 950 and may include other parameters such as the amount of data per a unit of time. The controller 911 may control the encoding unit 914, to prevent the occurrence of a failure of a received signal decoding operation of the decoding apparatus 940. The controller 911 may include, for example, a microcomputer having a processor, a random access memory and a read only memory.

The incoming signal 920 supplied from, for example, by a content provider may include frames or pictures in a video sequence, such as video sequence 101. The frame memory 913 may have a first area used for storing the pictures to be processed through a perceptual encoding system, such as the perceptual encoding system 100, implemented through the encoding unit 914. Perceptual representations and motion vectors may be derived from the pictures in video sequence 101, utilizing the controller 911. A second area in frame memory 913 may be used for reading out the stored data and outputting it to the encoding unit 914. The controller 911 may output an area switching control signal 923 to the frame memory 913. The area switching control signal 923 may indicate whether the first area or the second area is to be used.

The controller 911 outputs an encoding control signal 924 to the encoding unit 914. The encoding control signal 924 causes the encoding unit 914 to start an encoding operation. In response to the encoding control signal 924 from the controller 911, including control information associated with the pictures or frames, the encoding unit 914 reads out the pictures to a high-efficiency perceptual representation encoding process, to prepare the motion vectors, pointers and residual pictures for encoding them into a compressed bitstream.

The encoding unit 914 may prepare the encoded compressed bitstream 905 in a packetized elementary stream (PES) including video packets and program information packets. The encoding unit 914 may map the compressed pictures into video packets using a program time stamp (PTS) and the control information.

The encoded information may be stored in the transmitter buffer 915. Counter 912 may comprise an information amount counter that is incremented to indicate the amount of data in the transmitter buffer 915. As data is retrieved and removed from the buffer, the information amount counter 912 may be decremented to reflect the amount of data in the buffer. The occupied area information signal 926 is transmitted to the counter 912 to indicate whether data from the encoding unit 914 has been added or removed from the transmitted buffer 915 so the counter 912 can be incremented or decremented. The controller 911 controls the production of packets produced by the encoding unit 914 on the basis of occupied area information 926 communicated by the controller to the encoding unit in order to prevent an overflow or underflow from taking place in the transmitter buffer 915.

The information amount counter 912 is reset in response to a preset signal 928 generated and output by the controller 911. After the information amount counter 912 is reset, the counter counts data output by the encoding unit 914 and obtains the amount of information which has been generated. Then, the information amount counter 912 supplies the controller 911 with an information amount signal 929 representative of the obtained amount of information. The controller 911 controls the encoding unit 914 so that there is no overflow at the transmitter buffer 915.

The decoding apparatus 940 includes an interface 970 for receiving a compressed bitstream, such as compressed bitstream 905, a receiver buffer 950, a controller 953, a frame memory 952, a decoding unit 951 and an interface 975 for output. The perceptual decoding system 200 shown in FIG. 2 may be implemented in the decoding unit 951. The receiver buffer 950 of the decoding apparatus 940 may temporarily store encoded information including motion vectors, residual pictures and pointers received from the encoding apparatus 910 via the compressed bitstream 905. The decoding apparatus 940 counts the amount received data, and outputs a frame or picture number signal 963 which is applied to the controller 953. The controller 953 supervises the counted number of frames or pictures at a predetermined interval, for instance, each time the decoding unit 951 completes a decoding operation.

When the frame number signal 963 indicates the receiver buffer 950 is at a predetermined capacity or amount, the controller 953 may output a decoding start signal 964 to the decoding unit 951. When the frame number signal 963 indicates the receiver buffer 950 is at less than a predetermined capacity and the controller 953 waits for the occurrence of the situation in which the counted number of frames or pictures becomes equal to the predetermined amount. When the frame number signal 963 indicates the receiver buffer 950 is at the predetermined capacity, the controller 953 outputs the decoding start signal 964. The encoded frames, caption information and frame disparity maps may be decoded in a monotonic order (i.e., increasing or decreasing) based on a presentation time stamp (PTS) in a header of program information packets.

In response to the decoding start signal 964, the decoding unit 951 may decode data 961, amounting to one frame or picture, received from the receiver buffer 950. The decoding unit 951 writes a decoded video signal 962 into the frame memory 952. The frame memory 952 may have a first area into which the decoded video signal is written, and a second area used for reading out the decoded video data and outputting it to a monitor or the like.

According to an example, the encoding apparatus 910 may be incorporated or otherwise associated with a headend and the decoding apparatus 940 may be incorporated or otherwise associated with a handset or set top box. These may be utilized separately or together in methods for encoding and/or decoding associated with utilizing perceptual representations based on original pictures in a video sequence. Various manners in which the encoding apparatus 910 and the decoding apparatus 940 may be implemented are described in greater detail below with respect to FIGS. 10 and 11, which depict flow diagrams of methods 1000 and 1100.

The perceptual encoding system 100, in other embodiments, may not be included in the same unit that performs the initial encoding such as shown in FIG. 9. For example, the perceptual encoding system 100 may be provided in a separate device that receives an encoded video signal and perceptually encodes the video signal for transmission downstream to a decoder. Furthermore, the perceptual encoding system 100 may generate metadata that can be used by downstream processing elements, such as a transcoder. The metadata may include details describing the motion vectors estimated from perceptual representations, which may be used by the transcoder to control bit rate.

Methods

Method 1000 is a method for encoding which utilizes perceptual representations. Method 1100 is a method for decoding which utilizes perceptual representations. It is apparent to those of ordinary skill in the art that the methods 1000 and 1100 represent generalized illustrations and that other steps may be added or existing steps may be removed, modified or rearranged without departing from the scopes of the methods 1000 and 1100. The methods 1000 and 1100 are repeatable to continually encode and decode pictures in a video signal as they are received. The descriptions of the methods 1000 and 1100 are made with particular reference to the encoding apparatus 910 and the decoding apparatus 940 depicted in FIG. 9. It should, however, be understood that the methods 1000 and 1100 may be implemented in systems and/or devices which differ from the apparatus 910 and the decoding apparatus 940 without departing from the scopes of the methods 1000 and 1100.

Figure 10:
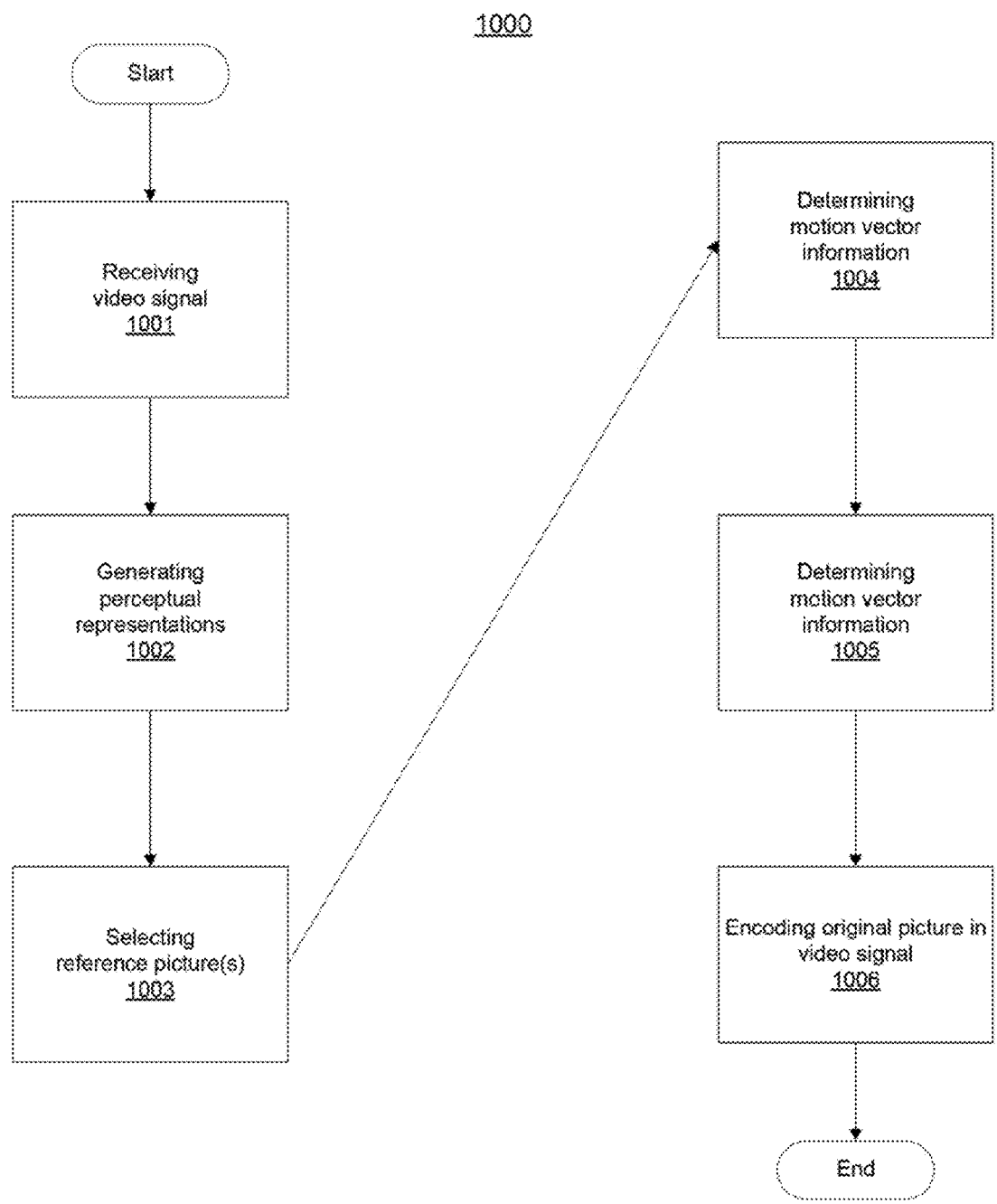
FIG. 10 is a flow diagram illustrating a method for encoding utilizing perceptual representations, according to an example.

With reference to the method 1000 in FIG. 10, at step 1001, the encoding apparatus 910 receives the video signal 920 including original pictures in a video sequence (e.g., video sequence 101 shown in FIG. 1) at an interface 930. For example, the received video signal 920 may be uncompressed original pictures in a video bitstream.

At step 1002, the encoding apparatus 910 generates perceptual representations based on the received original pictures utilizing the encoding unit 914 and the controller 911. This includes perceptual representations that may be used as target and reference perceptual representations.

At step 1003, the controller 911 selects one or more reference pictures from a plurality of reference pictures from the original pictures stored or located in the frame memory 913.

At step 1004, the encoding unit 914 and the controller 911 determines motion vector information based on the target perceptual representations and the reference pictures. The determined motion vector information may be determined based on attributes of the reference pictures and the target perceptual representations, such as low contrast features in the reference pictures and/or mach bands phenomena in the target perceptual representations. The determined motion vector information may include the motion vectors 113 shown in FIG. 1.

At step 1005, the encoding unit 914 and the controller 911 encode the original pictures using the motion vector information and the reference pictures. The residual picture 112 shown in FIG. 1 is an example of an encoded original picture.

Further, at step 1005, the encoding unit 914 and the controller 911 output the encoded original pictures, motion vector information and pointers associated with the selected reference pictures, such as pointer 114 shown in FIG. 1.

Figure 11:
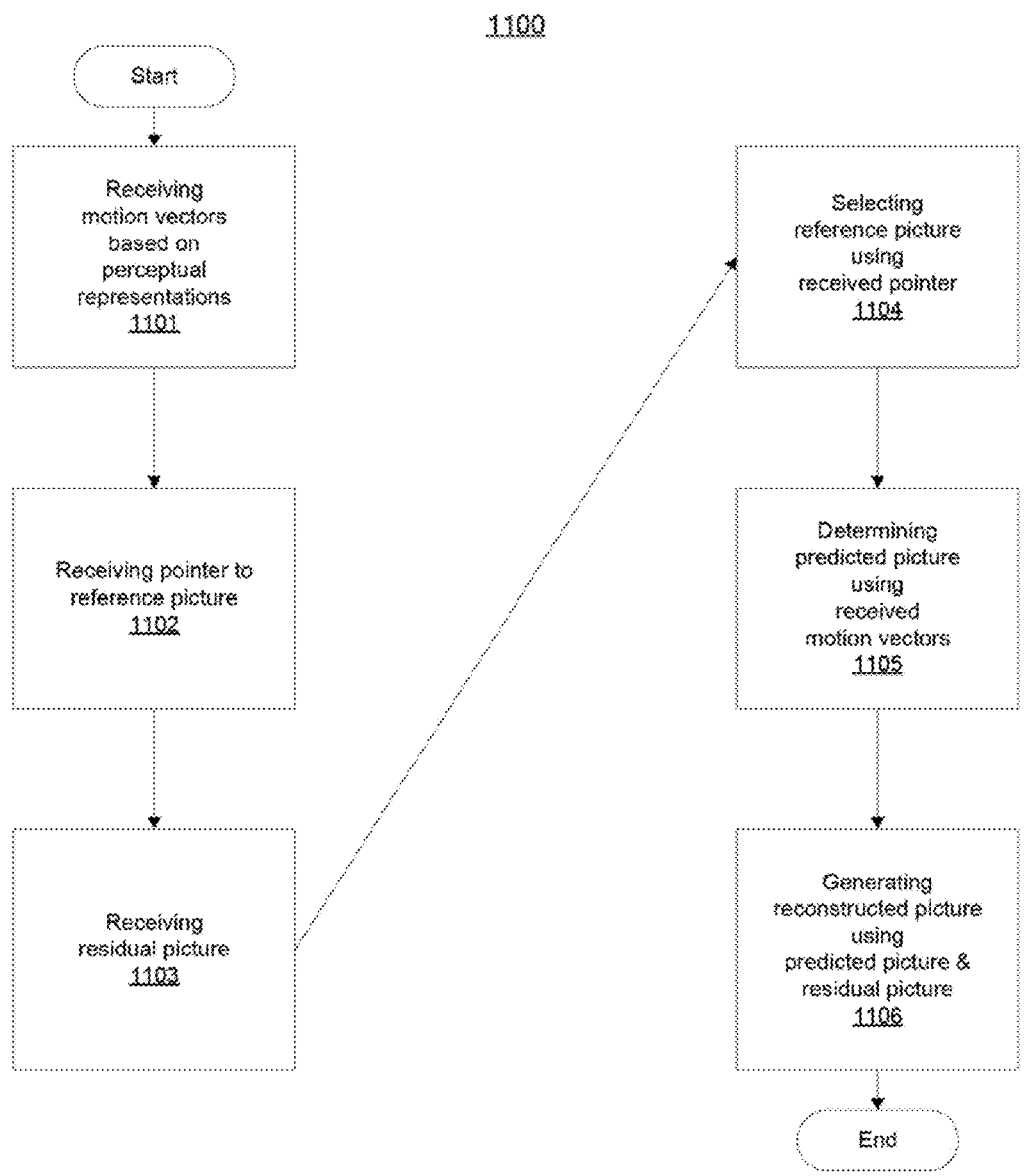
FIG. 11 is a flow diagram illustrating a method for decoding utilizing perceptual representations, according to an example.

With reference to the method 1100 in FIG. 11, at step 1101, the decoding apparatus 940 receives motion vector information from the compressed bitstream 905 at the receiver buffer 950 utilizing the interface 970. The received motion vector information is based on target perceptual representations based on original pictures from a video sequence including pictures, and also based on reference pictures associated with the target perceptual representations.

At step 1102, the decoding apparatus 940 receives pointers from the compressed bitstream 905 at the receiver buffer 950 utilizing the interface 970. The received pointers, such as pointer 114, are associated with respective reference pictures.

At step 1103, the decoding apparatus 940 receives encoded residual pictures associated with the received motion vector information from the compressed bitstream 905 at the receiver buffer 950 utilizing the interface 970.

At step 1104, the controller 953 selects reference pictures from a plurality of reference pictures stored or located in the receiver buffer 950 utilizing the respective received pointers.

At step 1105, the controller 953 and the decoding unit 951 determine predicted pictures based on the received motion vector information and the respective selected reference pictures.

At step 1106, the controller 953 and the decoding unit 951 generate reconstructed pictures based on the determined predicted pictures and the received residual pictures.

Some or all of the methods and operations described above may be provided as machine readable instructions, such as a utility, a computer program, etc., stored on a computer readable storage medium, which may be non-transitory such as hardware storage devices or other types of storage devices. For example, they may exist as program(s) comprised of program instructions in source code, object code, executable code or other formats.

An example of a computer readable storage media includes a conventional computer system RAM, ROM, EPROM, EEPROM, and magnetic or optical disks or tapes. Concrete examples of the foregoing include distribution of the programs on a CD ROM. It is therefore to be understood that any electronic device capable of executing the above-described functions may perform those functions enumerated above.

Figure 12:
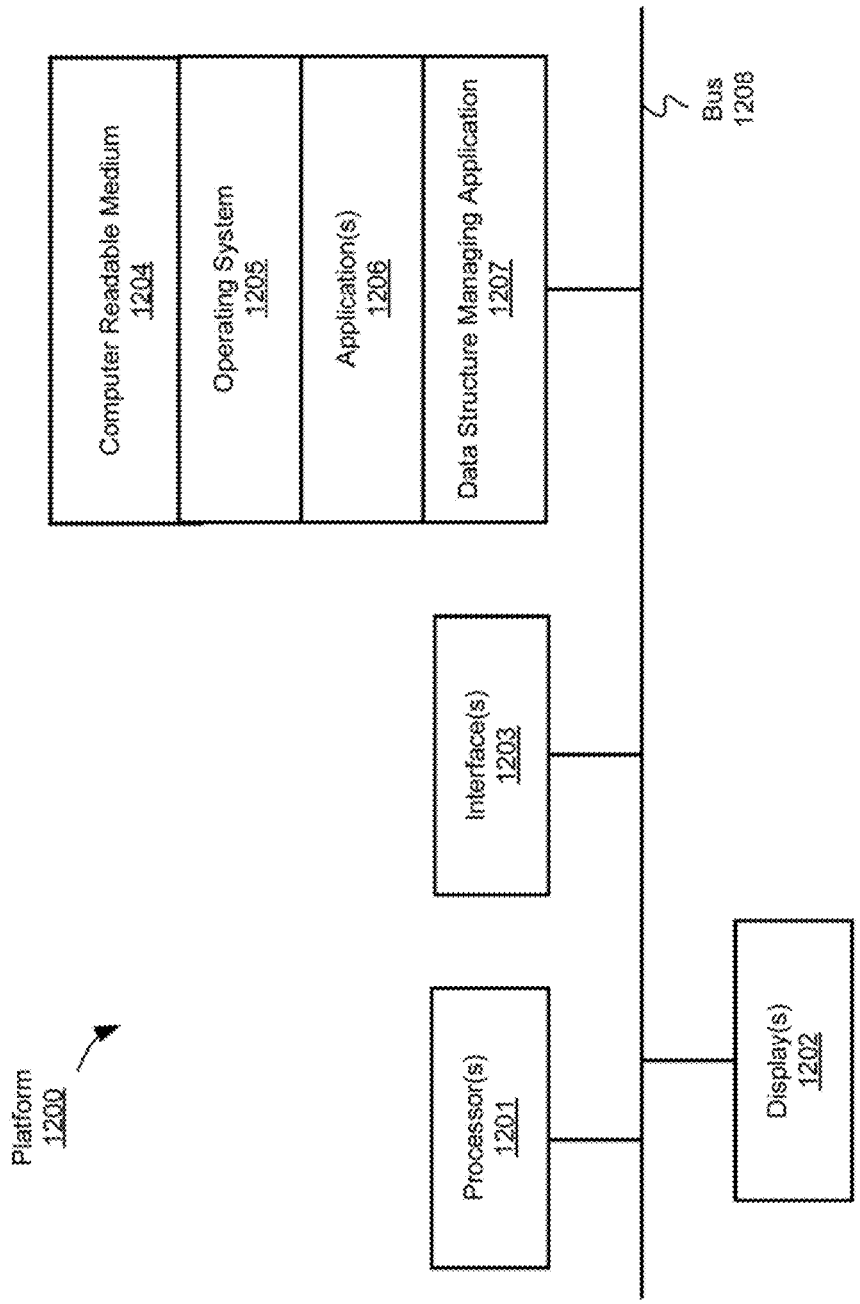
FIG. 12 is a block diagram illustrating a computer system to provide a platform for a system for encoding and/or a system for decoding, according to examples.

Referring to FIG. 12, there is shown a platform 1200, which may be employed as a computing device in a system for encoding or decoding which utilizes perceptual representations, such as perceptual encoding system 100 and/or encoding apparatus 910. The platform 1200 may also be used for an upstream decoding apparatus, such as a set top box, a handset, a mobile phone or other mobile device, a transcoder and other devices and apparatuses which may utilize perceptual representations and/or motion vectors determined utilizing the perceptual representations, such as perceptual decoding system 200 and/or decoding apparatus 940. It is understood that the illustration of the platform 1200 is a generalized illustration and that the platform 1200 may include additional components and that some of the components described may be removed and/or modified without departing from a scope of the platform 1200.

The platform 1200 includes a display 1202, such as a monitor, and further includes an interface 1203, such as a simple input interface and/or a network interface to a Local Area Network (LAN), a wireless 802.11x LAN, a 3G or 4G mobile WAN or a WiMax WAN, that may perform the functions of the interfaces of an encoding system or apparatus, such as interfaces 930 and 935 with respect to perceptual encoding system 100 and encoding apparatus 910, or the functions of the interfaces of a decoding system or apparatus, such as interfaces 970 and 975 with respect to perceptual decoding system 200 and decoding apparatus 940. The platform 1200 further includes a processor 1201, such as such as one or more microprocessors, microcontrollers, digital signal processors (DSPs), combinations thereof or such other devices known to those having ordinary skill in the art. The particular operations/functions described herein as being performed by the systems described herein for encoding or decoding, such as perceptual encoding system 100, encoding apparatus 910, perceptual decoding system 200, and decoding apparatus 940, other than functions that would be performed by display 1202 and interface 1203, are performed by the processor 1201 of the platform by an execution of software instructions and routines that are stored in a computer-readable medium (CRM) 1204 associated with the processor. However, one of ordinary skill in the art realizes that the operations/functions of processor 1201 alternatively may be implemented in hardware, for example, integrated circuits (ICs), application specific integrated circuits (ASICs), a programmable logic device such as a PLD, PLA, FPGA or PAL, and the like, implemented in the platform. Based on the present disclosure, one skilled in the art will be readily capable of producing and implementing such software and/or hardware without undo experimentation. Each of these components may be operatively coupled to a bus 1208. For example, the bus 1208 may be an EISA, a PCI, a USB, a FireWire, a NuBus, or a PDS.

The CRM 1204 may be any suitable medium which participates in providing instructions to the processor(s) 1201 for execution and may comprise the various memories and buffers described herein, such as memories 102 and 913 and buffer 915 with respect to encoding system 100 or apparatus 910 and memories 201 and 952 and buffer 950 with respect to decoding system 200 or apparatus 940. For example, the CRM 1204 may be non-volatile media, such as an optical or a magnetic disk; volatile media, such as memory; and transmission media, such as coaxial cables, copper wire, and fiber optics. Transmission media can also take the form of acoustic, light, or radio frequency waves. The CRM 1204 may also store other instructions or instruction sets, including word processors, browsers, email, instant messaging, media players, and telephony code.

The CRM 1204 may also store an operating system 1205, such as MAC OS, MS WINDOWS, UNIX, or LINUX; applications 1206, network applications, word processors, spreadsheet applications, browsers, email, instant messaging, media players such as games or mobile applications (e.g., "apps"); and a data structure managing application 1207. The operating system 1205 may be multi-user, multiprocessing, multitasking, multithreading, real-time and the like. The operating system 1205 may also perform basic tasks such as recognizing input from the interface 1203, including from input devices, such as a keyboard or a keypad; sending output to the display 1202 and keeping track of files and directories on CRM 1204; controlling peripheral devices, such as disk drives, printers, image capture device; and managing traffic on the bus 1208. The applications 1206 may include various components for establishing and maintaining network connections, such as code or instructions for implementing communication protocols including TCP/IP, HTTP, Ethernet, USB, and FireWire.

A data structure managing application, such as data structure managing application 1207 provides various code components for building/updating a computer readable system (CRS) architecture, for a non-volatile memory, as described above. In certain examples, some or all of the processes performed by the data structure managing application 1207 may be integrated into the operating system 1205. In certain examples, the processes may be at least partially implemented in digital electronic circuitry, in computer hardware, firmware, code, instruction sets, or any combination thereof.

Although described specifically throughout the entirety of the instant disclosure, representative examples have utility over a wide range of applications, and the above discussion is not intended and should not be construed to be limiting. The terms, descriptions and figures used herein are set forth by way of illustration only and are not meant as limitations. Those skilled in the art recognize that many variations are possible within the spirit and scope of the examples. While the examples have been described with reference to examples, those skilled in the art are able to make various modifications to the described examples without departing from the scope of the examples as described in the following claims, and their equivalents.

What is claimed is:

1. A system for encoding, the system comprising:
an interface configured to receive a video signal including original pictures in a video sequence; and
a processor configured to:
generate target perceptual representations from received original pictures,
select reference perceptual representations from a plurality of reference perceptual representations of pictures,
determine perceptual-reference representation motion vector information from the target perceptual representations and the reference perceptual representations, wherein the perceptual-representation motion vector information corresponds to the entire received original picture of the reference pictures,
encode the determined perceptual-representation motion vector information as data, and
store the target perceptual representations with the plurality of reference perceptual representations of pictures,
select reference pictures from a plurality of reference pictures to process independent of the perceptual-representation motion vector data, and
apply the perceptual-representation motion vector data to the selected reference pictures to generate a motion compensated representation of the original pictures,
wherein the processor is configured to generate the target perceptual representations by
generating spatial detail maps for pixel values of the original pictures,
determining sign information of the generated spatial detail maps,
determining absolute value information of the generated spatial detail maps, and
processing the determined sign information and the determined absolute value information to generate the target perceptual representations.

2. The system of claim 1, wherein the generated spatial detail maps include values associated with pixels in the original pictures.

3. The system of claim 1, wherein the generated spatial detail maps include values determined using a model of human perceptibility of features in the respective original pictures.

4. The system of claim 1, wherein the processor is configured to determine the absolute value information by
determining absolute value maps based on the respective generated spatial detail map; and
generating companded absolute value spatial detail maps based on a companding factor, the respective determined absolute value maps and the respective generated spatial detail maps.

5. The system of claim 1, wherein the original pictures in the video sequence are in a transition sequence of pictures in the video sequence.

6. The system of claim 5, wherein the transition sequence is characterized by at least one of a changing contrast attribute and a changing brightness attribute of pictures in a plurality of pictures in the video sequence.

7. A method for encoding, the method comprising:
receiving a video signal including original pictures in a video sequence;
generating target perceptual representations from the received original pictures;
selecting reference perceptual representations from a plurality of reference perceptual representations of pictures;
determining, utilizing a processor, perceptual-representation motion vector information from the target perceptual representations and the reference perceptual representations, wherein the perceptual-representation motion vector information corresponds to the entire received original picture;
encoding the determined perceptual-representation motion vector information as data;
storing the target perceptual representation with the plurality of reference perceptual representations of pictures;
selecting reference pictures from the plurality of reference pictures to process independent of the perceptual-representation motion vector data, and applying the perceptual-representation motion vector data to the selected reference pictures to generate a motion compensated representation of the original pictures, wherein the target perceptual representations are generated by generating spatial detail maps for pixel values of the original pictures, determining sign information of the generated spatial detail maps, determining absolute value information of the generated spatial detail maps, and processing the determined sign information and the determined absolute value information to generate the target perceptual representations.

8. A non-transitory computer readable medium (CRM) storing computer readable instructions for executing the method of claim 7.

9. A system for decoding, the system comprising:

an interface configured to receive perceptual-representation vector information wherein the perceptual-representation motion vector information is based on:

target perceptual representations of original pictures from a video sequence including pictures, and reference perceptual representations selected from a plurality of reference perceptual representations of pictures, receive residual pictures associated with the received perceptual-representation motion vector information; and a processor configured to:

select reference pictures from a plurality of reference pictures to process independent of the perceptual-representation motion vector information, determine predicted pictures from the received perceptual-representation motion vector information and the selected reference pictures, and generate reconstructed pictures from the predicted pictures and the residual pictures, wherein the target perceptual representations are generated by generating spatial detail maps for pixel values of the original pictures, determining sign information of the generated spatial detail maps, determining absolute value information of the generated spatial detail maps, and processing the determined sign information and the determined absolute value information to generate the target perceptual representations.

10. The system of claim 9, wherein the generated spatial detail maps include values associated with pixels in the original picture.

11. The system of claim 9, wherein the generated spatial detail maps include values determined using a model of human perceptibility of features in the original picture.

12. The system of claim 9, wherein the determined absolute value information is based on absolute value maps based on the respective generated spatial detail maps, and generated companded absolute value spatial detail maps based on, a companding factor, the respective absolute value maps, and the respective generated spatial detail maps.

13. The system of claim 9, wherein the original pictures in the video sequence are in a transition sequence of pictures in the video sequence.

14. The system of claim 13, wherein the transition sequence is characterized by at least one of a changing contrast attribute and a changing brightness attribute of pictures in the transition sequence.

15. A method for decoding, the method comprising:

receiving perceptual-representation motion vector information, wherein the perceptual-representation motion vector information is based on:

target perceptual representations of original pictures from a video sequence including pictures, and reference perceptual representations selected from a plurality of reference perceptual representations of pictures, receiving residual pictures associated with the received perceptual-representation motion vector information;

selecting reference pictures from a plurality of reference pictures to process independent of the perceptual-representation motion vector data;

determining, utilizing a processor, predicted pictures from the received perceptual-representation motion vector information and the selected reference pictures; and generating reconstructed pictures from the determined predicted pictures and the received residual pictures, wherein the target perceptual representations are generated by generating spatial detail maps for pixel values of the original pictures, determining sign information of the generated spatial detail maps, determining absolute value information of the generated spatial detail maps, and processing the determined sign information and the determined absolute value information to generate the target perceptual representations.

16. A non-transitory computer readable medium (CRM) storing computer readable instructions for executing the method of claim 15.

* * * * *